United States Patent [19]

Takeuchi

[11] Patent Number: 4,542,680
[45] Date of Patent: Sep. 24, 1985

[54] VACUUM BOOSTER DEVICE

[75] Inventor: Hiroo Takeuchi, Asashina, Japan

[73] Assignee: Nissan Kogyo Kabushiki Kaisha, Ueda, Japan

[21] Appl. No.: 348,109

[22] Filed: Feb. 11, 1982

[30] Foreign Application Priority Data

Jul. 1, 1981 [JP] Japan .................................. 56-103750

[51] Int. Cl.⁴ ................................................ F15B 9/10
[52] U.S. Cl. ..................... 91/369 A; 92/94; 92/99; 92/169
[58] Field of Search .............. 91/369 A, 376 R, 422; 92/98 D, 165 PR, 166, 99, 94

[56] References Cited

U.S. PATENT DOCUMENTS

| | | | |
|---|---|---|---|
| 3,543,298 | 11/1970 | Rockwell | 91/369 A |
| 3,688,647 | 9/1972 | Kytta | 91/369 A |
| 3,921,501 | 11/1975 | Rosback | 91/422 |
| 4,245,845 | 1/1981 | Ando | 92/98 D |
| 4,292,887 | 10/1981 | Ohta | 92/99 |
| 4,325,218 | 4/1982 | Weiler | 92/98 D |
| 4,328,738 | 5/1982 | Hamamatsu | 92/99 |
| 4,334,459 | 6/1982 | Riedel | 92/166 |
| 4,377,966 | 3/1983 | Parker | 92/98 D |
| 4,398,449 | 8/1983 | Takayama | 91/369 A |
| 4,399,735 | 8/1983 | Katagiri | 91/369 B |
| 4,428,274 | 1/1984 | Takeuchi | 92/98 D |

Primary Examiner—Abraham Hershkovitz
Attorney, Agent, or Firm—Roberts, Spiecens & Cohen

[57] ABSTRACT

The diaphragm of a vacuum booster device is normally placed in intimate contact with the disc portion of the booster piston due to the pressure difference between the first and second working chambers. The diaphragm has through-holes which the tie rods penetrate, and the peripheral portion of each through-hole is resiliently pushed to the disc portion of the booster piston by means of an elastic member. When the booster piston is manually operated while no vacuum pressure is stored in the first working chamber, the air in the first working chamber compressed by the advance of the booster piston is discharged into the second working chamber through the through-hole of the diaphragm, thus insuring smooth manual operation of the booster piston. When vacuum pressure is stored in the first working chamber, the peripheral portion of the through-hole of the diaphragm is resiliently pushed to the disc portion of the booster piston by the elastic member, thereby reliably closing the through-hole of the diaphragm and preventing unnecessary leakage of the vacuum pressure from the first working chamber to the second working chamber.

8 Claims, 8 Drawing Figures

VACUUM BOOSTER DEVICE

BACKGROUND OF THE INVENTION

1. Field of the Invention

This invention primarily relates to a vacuum booster device for boosting the master cylinder of an automotive hydraulic brake or clutch or the like with a vacuum force. More particularly, the present invention relates to a vacuum booster device of the type having the construction in which a booster piston is axially slidably accommodated in a booster shell for dividing, in cooperation with a diaphragm, the interior of the booster shell into a front side first working chamber in communication with a vacuum supply source and a rear side second working chamber in communication selectively with the first working chamber or the atmosphere via a control valve means operatively connected to an input member, said diaphragm being superposed on the rear surface of a disc portion of the booster piston and having an inner circumferential bead connected to the booster piston and an outer circumferential bead connected to the circumferential wall of the booster shell; both front and rear walls of the booster shell are connected to each other by tie rods extending through the disc portion of the booster piston and the diaphragm; and seal means are provided for through-holes in the booster piston.

2. Description of the Prior Art

The booster device of the above-described kind is used in such a manner that the rear end portions of the tie rods are fixed to a vehicle body serving as the support wall and the master cylinder is fitted to the front end portions of the tie rods. During operation, the device is able to transmit the forward thrust load, applied from the booster piston to the master cylinder, to the support wall via the tie rods thereby to prevent the booster shell from bearing the load. Accordingly, the booster device of this type has the advantage that the booster shell need not have such high rigidity as to withstand the load and can be formed from thin steel sheet, synthetic resin or the like material to reduce its weight.

However, generally in the known devices, when the booster piston is manually operated for actuating the master cylinder while the vacuum supply source is in an inoperative state and hence, when no vacuum pressure is accumulated in the first working chamber, the air inside the first working chamber is compressed by the advancing booster piston to produce discharge resistance against the vacuum supply source, hindering the advance movement of the booster piston so that its manual operation is likely to become unsteady.

SUMMARY OF THE INVENTION

It is therefore an object of the present invention to provide a booster device of the above-mentioned type having a simple but effective structure in which, when the booster piston is manually operated while no vacuum pressure is accumulated in the first working chamber, the air compressed in the first working chamber is discharged into the second working chamber by use in through-holes of the diaphragm through which the tie rods extend, thereby insuring smooth and light manual operation of the booster piston, and in the ordinary state where vacuum pressure is stored in the first working chamber, the through-holes in the diaphragm are reliably closed to prevent unnecessary leakage of the vacuum pressure from the first working chamber to the second working chamber.

In accordance with the present invention, there is provided an improved vacuum booster device comprising a booster shell; a booster piston axially slidably accommodated in the booster shell and having a disc portion; a diaphragm having an inner circumferential bead coupled in superposition to the rear surface of the disc portion of the booster piston and an outer circumferential bead coupled to the circumferential wall of the booster shell; the booster piston and the diaphragm together dividing the interior of the booster shell into a front side first working chamber connected to a vacuum supply source and a rear side second working chamber selectively connected to the first working chamber or to the atmosphere via a control valve means operatively connected to an input member; tie rods extending through the booster piston and the diaphragm and connecting the front and rear walls of the booster shell with each other; the booster piston having through holes through which the tie rods penetrate; and seal means disposed in the through-holes of the booster piston hermetically sealing the space between the booster piston and the tie rods; the improvement wherein an elastic member resiliently pushes the peripheral portion of the diaphragm around a through-hole in the diaphragm against the peripheral portion of the booster piston, the diaphragm is at at least portions of the inner and outer circumferential beads thereof normally placed in intimate contact with the disc portion of the booster piston due to the pressure difference between the first and second working chambers, and when the internal pressure of the first working chamber becomes greater than that of the second working chamber, the diaphragm is separated from the disc portion to form a gap therebetween and simultaneously separates the peripheral portion around the through-hole in the diaphragm from the disc portion against the resiliency of the elastic member, thereby mutually communicating the first and second working chambers via the gap between the diaphragm and the disc portion and via the through-hole.

The above and other objects, features and advantages of the present invention will become apparent from the following detailed description of preferred embodiments when taken in conjunction with the accompanying drawings.

DESCRIPTION OF THE PREFERRED EMBODIMENTS

Figure 1:
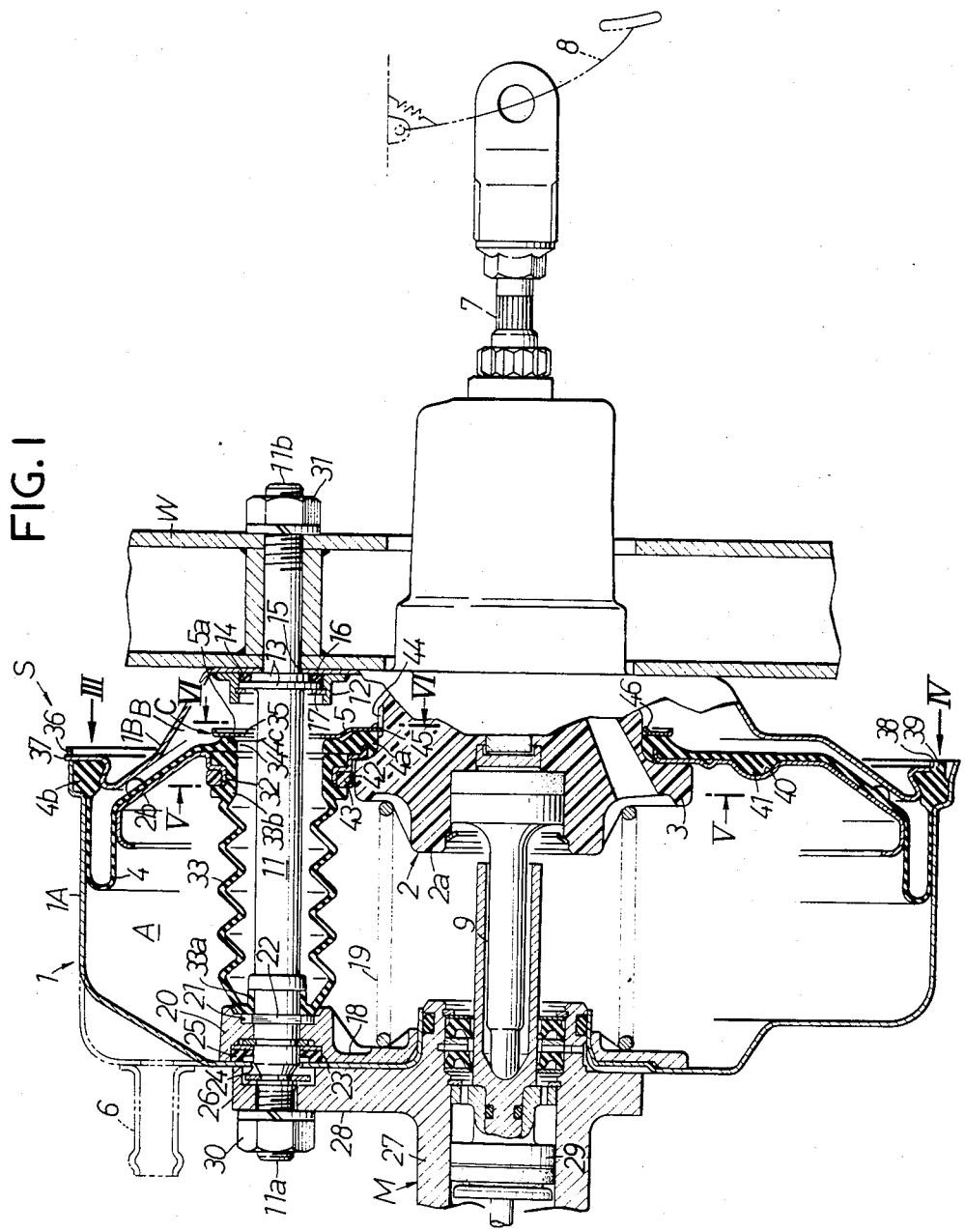
FIG. 1 is a longitudinal sectional view of a vacuum booster device in accordance with an embodiment of the present invention.

Hereinafter, preferred embodiments of the present invention will be described with reference to the accompanying drawings. In FIG. 1, a support wall W forms the rear wall of the engine compartment of an automotive engine, and a vacuum booster device S in accordance with the present invention is fitted to the front surface of the support wall W. A brake master cylinder M is coupled to the front edge of the booster device S.

A booster shell 1 of the booster device S consists of a front shell 1A and a rear shell 1B that are divided in the axial direction and are formed from thin steel sheet or synthetic resin. A booster piston 2 is accommodated inside this booster shell 1 for axially sliding movement. The booster piston 2 is composed of a central boss portion 2a made of synthetic resin and a disc portion 2b of steel sheet engaging the rear surface of a flange 3 formed integrally around the outer circumference of the control boss portion 2a. A rolling diaphragm 4 is placed on the rear surface of the disc portion 2b. The diaphragm 4 has integral beads 4a and 4b around its inner and outer circumferences, respectively. The inner cirucmferential bead 4a is connected to the inner circumferential end of the disc portion 2b and is fitted airtight to the outer circumference of the central boss portion 2a, while the outer circumferential bead 4b is clamped between abutting end portions of the front and rear shells 1A and 1B. An elastic anchor ring 5 made of steel sheet is anchored to the outer circumference of the central boss portion 2a, and the inner circumferential bead 4a is clamped between the anchor ring 5 and the flange 3 of the central boss portion 2a.

The booster piston 2 as well as the diaphragm 4 divide the interior of the booster shell 1 into a front side first working chamber A and a rear side second working chamber B. The first working chamber A is placed in constant communication with an intake manifold (not shown) of the engine as a vacuum supply source via a vacuum inlet pipe 6 while the second working chamber B is adapted to be alternately connected to the first working chamber A or to the atmosphere by means of a control valve, which is operated by the forward and backward movement of an input rod 7. When vacuum pressure is stored in the first working chamber A and the input rod 7 is advanced by the operation of a brake pedal so as to communicate the second working chamber B with the atmosphere, a pressure difference occurs between both working chambers A and B and applies a propelling force to the booster piston 2 so that this booster piston 2 is advanced to drive an operation piston 29 of the master cylinder M forward via an output rod 9.

Two tie rods 11 extend through the end walls of the front and rear shells 1A, 1B, the disc portion 2b of the booster piston 2 and the diaphragm 4 in parallel relation. (Only one tie rod 11 is shown in FIG. 1.)

A support cylinder 12, through which the tie rod 11 passes, is welded to the inner surface of the end wall of the rear shell 1B and a stepped flange 13 integrally formed around the outer circumference of the tie rod 11 is fitted into the support cylinder 12. In this case, a seal member 16 for sealing a tie rod through-hole 15 of the rear shell 1B is fitted into an annular housing 14 that is defined by the stepped flange 13, the cylinder 12 and the end wall of the rear shell 1B. A retaining ring 17 for clamping a larger diameter portion of the stepped flange 13 in cooperation with this seal member 16 is anchored to the inner circumferential wall of the support cylinder 12. Thus, the tie rod 11 is fixed to the end wall of the rear shell 1B.

A clamp plate 18 is superposed on the inner surface of the end wall of the front shell 1A and supports a fixed end of a return spring 19 which urges the booster piston 2 rearward. A pair of bosses 20 are integrally formed with both ends of clamp plate 18 (though only one is shown in the drawing) and the two tie rods 11 penetrate through these bosses 20, thereby stopping rotation of the clamp plate 18. A recessed hole 21 having a split circular shape is formed on the inner end surface of each boss 20 and a flange 22 having a split circular shape corresponding to that of the hole 21 is formed on the tie rod 11 and fits into the hole, thereby stopping rotation of tie rod 11. A seal housing 23 is formed on the outer end surface of the boss 20 and a seal member 25 for sealing a tie rod through-hole 24 of the front shell 1A is fitted into this housing 23.

Bolts 11a and 11b are formed at both ends of each tie rod 11 so as to protrude forward and rearward with respect to the booster shell 1. A circlip 26 for preventing the front shell 1A from falling is fitted to the base portion of the forward bolt 11a. The bolt 11a penetrates through a fitting flange 28 formed at the rear end of the cylinder main body 27 of the master cylinder M and a nut 30 is screwed on bolt 11a. Thus, the master cylinder M is fitted to the front surface of the booster shell 1 via the tie rods 11 and clamps and reinforces the end wall of the front shell 1A in cooperation with the clamp plate 18. The front and rear shells 1A and 1B are integrally coupled together via the tie rods 11.

The rear bolt 11b penetrates through the support wall W and a nut 31 is screwed therein, thereby fixing the booster shell 1 to the support wall W via the tie rods 11.

Seal means, which will be described below, are applied to through-holes 32 of the booster piston 2 through which the tie rods 11 penetrate.

Inside the first working chamber A, the tie rods 11 are surrounded by flexible bellows 33 whose front ends 33a and rear ends 33b are hermetically fitted on the outer circumferences of the tie rods 11 and in the through-holes 32, respectively. Due to their flexibility, the bellows 33 are capable of sealing the through-holes 32 without hindering the forward and rearward movement of the booster piston 2.

The superposed surfaces of the disc portion 2b of the booster piston 2 and the diaphragm 4 can be separated from each other except at the portion of the inner circumferential bead 4a and in communication with the second working chamber B via a through-hole 34 of the diaphragm 4 through which the tie rod 11 penetrates. The through-hole 34 is defined by an annular bead 4c which is integral with the diaphragm 4 and is generally brought into intimate contact with the rear surface of the rear end portion 33b of the bellows 33 but in a detachable manner by means of an elastic member C.

The elastic member C is formed integrally so as to extend from the outer circumference of the anchor ring 5 and consists of an elastic push plate 5a that is brought into pressure contact with the rear surface of the annular bead 4c. The push plate 5a has a circular hole 35 as shown in solid lines in FIG. 6 but it may also be formed with a U-shaped slit 35' as shown in dotted outline FIG. 6, which serves as an opening to permit communication between the through-hole 34 and the second working chamber B.

Figure 7:
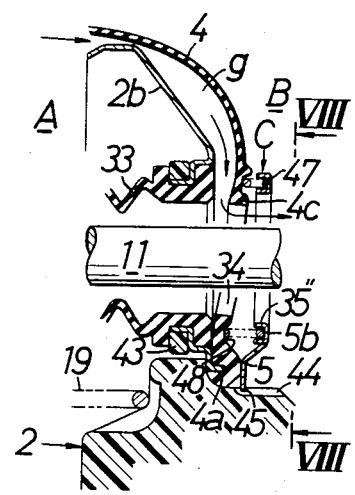
FIG. 7 is a schematic view of another embodiment of the vacuum booster device of the present invention, the drawing being analogous to FIG. 2.
Figure 8:
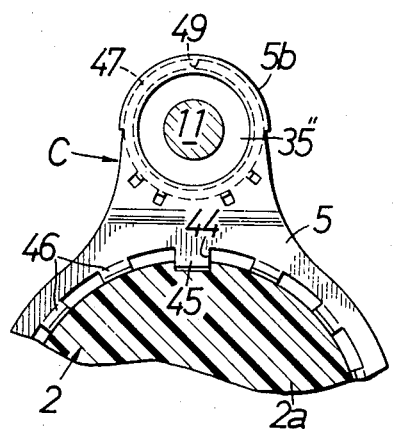
FIG. 8 is a sectional view taken along line VIII—VIII in FIG. 7.

As depicted in FIGS. 7 and 8, the elastic member C which is integrally formed with the outer circumference of the anchor ring 5 so as to extend therefrom is composed of a spring seat 5b disposed opposite the rear surface of the annular bead 4c with a predetermined gap between them and a coiled spring 47 is placed under compression between the annular bead 4c and the spring seat 5b. In this case, annular grooves 48, 49 are formed at support portions of the annular bead 4c and spring seat 5b in order to prevent the spring 47 from dislodging. The spring seat 5b has a circular hole 35" of a large diameter through which the tie rod 11 penetrates with clearance.

Figure 2:
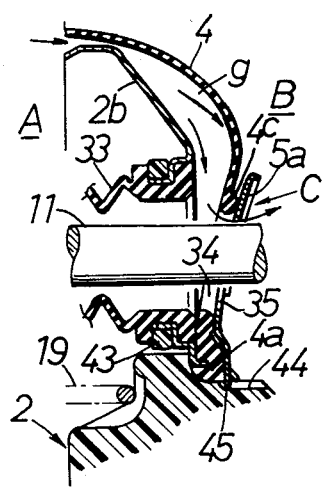
FIG. 2 is a schematic view for explaining the operation of the principal portions of the booster device of FIG. 1.

In order to concentrically arrange the through-hole 32 of the booster piston 2, the through-hole 34 of the diaphragm 4 and the openings 35, 35' (FIGS. 1, 2 and 6) or the circular hole 35" of the spring seat 5b (FIGS. 7 and 8) with the tie rods 11, the following locating means are provided at the connecting portions of the front and rear shells 1A, 1B of the booster shell 1, the diaphragm 4, the disc portion 2b and central boss portion 2a of the booster piston 2 and the anchor ring 5.

Figure 3:
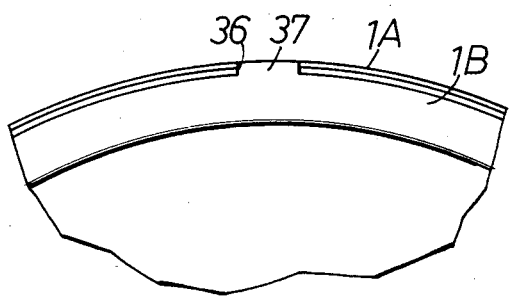
FIGS. 3 and 4 are side views as viewed from the directions indicated by arrows III and IV in FIG. 1.
Figure 4:
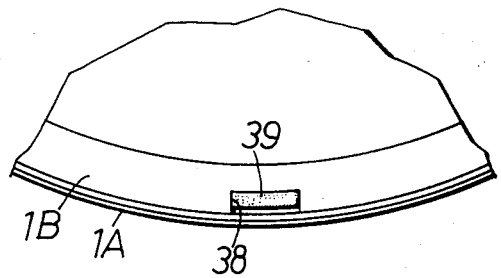
Figure 5:
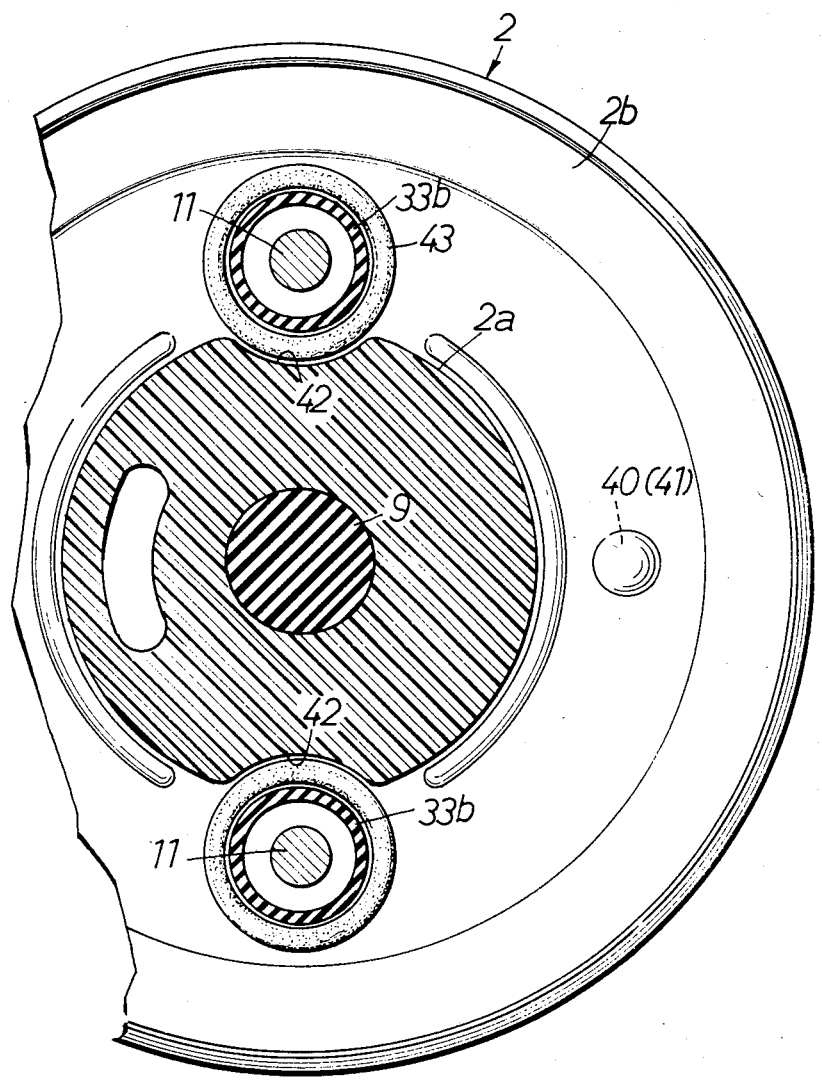
FIGS. 5 and 6 are sectional views taken along lines V—V and VI—VI in FIG 1, respectively.
Figure 6:
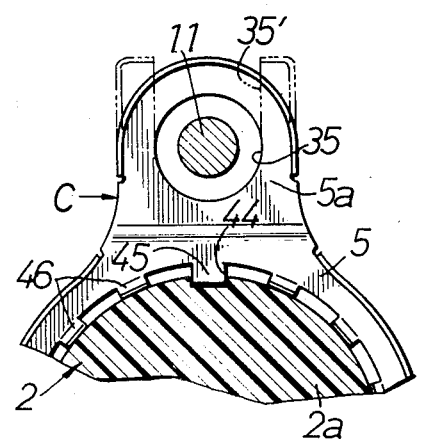

Namely, as shown in FIG. 3, a locating slit 36 and a locating pawl 37, which are engaged with each other, are disposed at the connecting end portions of the front and rear shells 1A and 1B, respectively, while a locating slit 38 and a locating projection 39 for engaging with each other are disposed at the connecting portions between the rear shell 1B and the outer circumferential bead 4b of the diaphragm 4, respectively, as shown in FIG. 4. A locating recess 40 and a locating protuberance 41 to be engaged with each other are disposed on the superposed surfaces of the disc portion 2b and the diaphragm 4, respectively, as shown in FIG. 1. A semicircular locating slit 42 is formed on the outer circumference of the flange 3 of the central boss portion 2a as shown in FIG. 5 and a locating ring 43 to be engaged with the slit 42 is fitted around the portion of the disc portion 2b encompassing the rear end portion 33b of the bellows. Furthermore, a locating groove 44 and a locating pawl 45 for engaging with each other are disposed at the connecting portions between the central boss portion 2a and the anchor ring 5 as shown in FIG. 6. Reference numeral 46 represents an elastic anchor pawl for anchoring the anchor ring 5 to the outer circumference of the central boss portion 2a.

In the above-described arrangement, it will now be assumed that a high vacuum pressure is accumulated in the first working chamber A and a large suction force due to the vacuum pressure acts upon the end wall of the front shell 1A, which has especially low rigidity. This suction force is transmitted to and resisted by the support wall W via the clamp plate 18 and the tie rods 11. Moreover, since the end wall of the front shell 1A is clamped and reinforced by the clamp plate 18 and the fitting flange 28 of the master cylinder M, it undergoes little inward deformation. Since the clamp plate 18 supports the fixed end of the return spring 19, it also transmits the resiliency of the return spring 19 to the tie rods 11 but not to the front shell 1A.

When the booster piston 2 is operated to advance by the advancing operation of the input rod 7 through the brake pedal 8, the booster piston 2 pushes the operation piston 29 of the master cylinder M forwardly to generate oil pressure inside an oil pressure chamber, thereby actuating the wheel brakes. In this case, the forward push force of a operation piston 29 acts as the forward thrust load upon the cylinder main body 27 of the master cylinder M via the oil pressure. But this load is transmitted to and resisted by the support wall W via the fitting flange 28 and the tie rods 11. Accordingly, the booster shell 1 does not bear the load and can be kept from being deformed by the load.

Next, it will be assumed that no vacuum pressure exists in the vacuum supply source and hence, no vacuum pressure is accumulated in the first working chamber A. If the booster piston 2 is pushed forward by advancing the input rod 7, communication between the second working chamber B and the first working chamber A is interrupted and chamber B is in turn connected to the atmosphere by the control valve (not shown) so that the air inside the first working chamber A is compressed and tends to be discharged towards the vacuum supply source from the vacuum inlet pipe 6. However, when the pressure inside the chamber B rises and exceeds a predetermined value due to the discharge resistance, the pressure is applied between the superposed surfaces of the disc portion 2b of the booster piston 2 and the diaphragm 4 to form a gap g thereat separating the annular bead 4c from the rear end 33b of the bellows 33 against the resilient force of the push plate 5a (FIG. 2) or the resiliency of the coiled spring 47 (FIG. 7). As a result, the air inside the first working chamber A is discharged into the second working chamber B under the atmospheric pressure through the gap g and the through-hole 34. For this reason, almost no discharge resistance of the air exists in the first working chamber A and hence, the booster piston 2 can be manually operated lightly.

In accordance with the present invention as described above, the anchor ring for fixing the inner circumferential bead of the diaphragm is anchored to the central boss portion of the booster piston, and those surfaces of the disc portion of the booster piston and the diaphragm which are detachably superposed on each other is in communication with the second working chamber via the through-hole in the diaphragm so that the peripheral portion around the through-hole of the diaphragm is pushed towards the disc portion of the booster piston by means of the resiliency of the elastic member. Accordingly, when the booster piston is manually operated under the state where no vacuum pressure is stored in the first working chamber, the air inside the first working chamber compressed by the advance of the booster piston can be discharged into the second working chamber through the through-hole of the diaphragm so that the manual operation can be effected lightly. Since the excessive air pressure is prevented from acting upon the diaphragm in this case, durability of the diaphragm is not adversely affected. In the ordinary state in which vacuum pressure is accumulated in the first working chamber, the peripheral portion around the through-hole in the diaphragm is pushed against the booster piston by means of the push force of the elastic member, thus enabling a reliable sealing of the through-hole. Hence, unnecessary leakage of the negative pressure from the first working chamber to the second working chamber can be prevented reliably.

If the elastic member is composed of the resilient push plate formed integrally with the anchor ring that is used to fix the inner circumferential bead of the diaphragm to the central boss portion of the booster piston, the construction can be simplified without increasing the number of components and the assembling operation also becomes easier because the push plate can be set to the predetermined position simultaneously with the fitting of the anchor ring.

Furthermore, if the elastic member is composed of the spring seat fixed to the booster piston inside the second working chamber opposite the peripheral portion around the through-hole of the diaphragm and spring means compressed between the spring seat and the peripheral portion around the through-hole of the diaphragm, the air inside the first working chamber is discharged into the second working chamber through the gap defined between the disc portion of the booster piston and the diaphragm and then through the through-hole of the diaphragm in accordance with the advancing movement of the booster piston during the manual operation thereof, and the peripheral portion around the through-hole of the diaphragm comes away from the booster piston with an inclining movement. In this case, the spring means can be freely deformed in response to the inclination of the diaphragm at any fitting position so that the diaphragm can be reliably displaced from the booster piston.

While preferred embodiments have been described, variations thereto will occur to those skilled in the art within the scope of the present inventive concepts which are delineated by the following claims.

What is claimed is:

1. A vacuum booster device comprising:
   a booster shell;
   a booster piston axially slidably accommodated in said booster shell and having a disc portion;
   a diaphragm having an inner circumferential bead coupled to an inner circumferential end of said disc portion of said booster piston, an outer circumferential bead coupled to the circumferential wall of said booster shell and an intermediate portion extending between said inner and outer circumferential beads, said intermediate portion being separably superposed on the rear surface of the disc portion;
   said booster piston and said diaphragm together dividing the interior of said booster shell into a front side first working chamber in communication with a vacuum supply source and a rear side second working chamber selectively in communication with said first working chamber or to the atmosphere via a control valve operatively connected to an input member;
   tie rods extending through said booster piston and said intermediate portion of the diaphragm connecting front and rear walls of said booster shell with each other;
   said booster piston and diaphragm having through-holes through which said tie rods penetrate, said diaphragm including an annular peripheral portion surrounding each through-hole;
   seal means disposed in said through-holes in said booster piston for air-tight sealing of the space formed between said booster piston and said tie rods;
   and an elastic member resiliently biasing the annular peripheral portion around each through-hole provided in said diaphragm towards said disc portion of said booster piston, said diaphragm being at at least said intermediate portion normally placed in initmate contact with the rear surface of said disc portion of said booster piston due to the pressure difference between said first and second working chambers and by said elastic member, and when the internal pressure of said first working chamber becomes greater than that of said second working chamber, said diaphragm being separated from said disc portion to define a gap therebetween and simultaneously moving the peripheral portion around said through-hole thereof away from said disc portion against the resiliency of said elastic member, thereby providing communication between said first and second working chambers via the gap between said diaphragm and said disc portion and via said through-hole;
   said device further comprising an anchor ring securing said inner circumferential bead of said diaphragm against a central boss portion of said booster piston, said elastic member comprising an elastic push plate integrally formed with said anchor ring, said booster piston being provided with a locating groove on the outer circumference of said central boss portion thereof, said anchor ring including a locating pawl engaging said locating groove.

2. A vacuum booster device comprising:
   a booster shell;
   a booster piston axially slidably accommodated in said booster shell and having a disc portion;
   a diaphragm having an inner circumferential bead coupled to an inner curcumferential end of said disc portion of said booster piston, an outer circumferential bead coupled to the circumferential wall of said booster shell and an intermediate portion extending between said inner and outer circumferential beads, said intermediate portion being separably superposed on the rear surface of the disc portion;
   said booster piston and said diaphragm together dividing the interior of said booster shell into a front side first working chamber in communication with a vacuum supply source and a rear side second working chamber selectively in communication with said first working chamber or to the atmosphere via a control valve operatively connected to an input member;
   tie rods extending through said booster piston and said intermediate portion of the diaphragm connecting front and rear walls of said booster shell with each other;
   said booster piston and diaphragm having through holes through which said tie rods penetrate, said diaphragm including an annular peripheral portion surrounding each through-hole;
   seal means disposed in said through-holes in said booster piston for air-tight sealing of the space formed between said booster piston and said tie rods;
   and an elastic member resiliently biasing the annular peripheral portion around each through-hole provided in said diaphragm towards said disc portion of said booster piston, said diaphragm being at at least said intermediate portion normally placed in intimate contact with the rear surface of said disc portion of said booster piston due to the pressure difference between said first and second working chambers and by said elastic member, and when the internal pressure of said first working chamber becomes greater than that of said second working chamber, said diaphragm being separated from said disc portion to define a gap therebetween and simultaneously moving the peripheral portion around said through-hole thereof away from said disc portion against the resiliency of said elastic member, thereby providing communication between said first and second working chambers via the gap between said diaphragm and said disc portion and via said through-hole;

said device further comprising an anchor ring securing said inner circumferential bead of said diaphragm against a central boss portion of said booster piston, said elastic member comprising an elastic push plate integrally formed with said anchor ring, said push plate extending radially outwards from said anchor ring and being resiliently bendable therefrom to form said gap.

3. A device as set forth in claim 2, wherein said through-hole in said diaphragm is defined by said annular peripheral portion integral with said diaphragm.

4. A device as set forth in claim 3, wherein said seal means comprises flexible bellows encompassing said tie rods and having the front ends thereof fitted to said tie rods and the rear ends thereof fitted into said through-hole in said booster piston, and said annular peripheral portion is resiliently pushed against the rear end of said bellows by said push plate.

5. A device as set forth in claim 2, wherein said push plate has an opening portion allowing communication between said through-hole in said diaphragm and said second working chamber.

6. A device as set forth in claim 2 wherein said push plate has an opening with clearance for the respective tie rod.

7. A vacuum booster device comprising:
a booster shell;
a booster piston axially slidably accommodated in said booster shell and having a disc portion;
a diaphragm having an inner circumferential bead coupled to an inner circumferential end of said disc portion of said booster piston, an outer circumferential bead coupled to the circumferential wall of said booster shell and an intermediate portion extending between said inner and outer circumferential beads, said intermediate portion being separably superposed on the rear surface of the disc portion;
said booster piston and said diaphragm together dividing the interior of said booster shell into a front side first working chamber in communication with a vacuum supply source and a rear side second working chamber selectively in communication with said first working chamber or to the atmosphere via a control valve operatively connected to an input member;
tie rods extending through said booster piston and said intermediate portion of the diaphragm connecting front and rear walls of said booster shell with each other;
said booster piston and diaphragm having through-holes through which said tie rods penetrate, said diaphragm including an annular peripheral portion surrounding each through-hole;
seal means disposed in said through-holes in said booster piston for air-tight sealing of the space formed between said booster piston and said tie rods;
and an elastic member resiliently biasing the annular peripheral portion around each through-hole provided in said diaphragm towards said disc portion of said booster piston, said diaphragm being at at least said intermediate portion normally placed in intimate contact with the rear surface of said disc portion of said booster piston due to the pressure difference between said first and second working chambers and by said elastic member, and when the internal pressure of said first working chamber becomes greater than that of said second working chamber, said diaphragm being separated from said disc portion to define a gap therebetween and simultaneously moving the peripheral portion around said through-hole thereof away from said disc portion against the resiliency of said elastic member, thereby providing communication between said first and second working chambers via the gap between said diaphragm and said disc portion and via said through-hole;

said elastic member comprising a spring seat fixed to said booster piston inside said second working chamber in facing relation with the peripheral portion around said through-hole in said diaphragm and spring means compressed between said spring seat and said peripheral portion around said through-hole in said diaphragm.

8. A device as set forth in claim 7, comprising an anchor ring coupling said inner circumferential bead of said diaphragm and said booster piston, and said spring seat being formed integrally with said anchor ring.

* * * * *